United States Patent
Ideura et al.

(10) Patent No.: US 9,332,214 B2
(45) Date of Patent: May 3, 2016

(54) VIDEO SIGNAL ADJUSTMENT SYSTEM AND METHOD FOR CONTROLLING THE SAME

(75) Inventors: Katsuji Ideura, Shinagawa (JP);
Kazuhiro Yasuno, Shinagawa (JP);
Takashi Iwao, Shinagawa (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 287 days.

(21) Appl. No.: 12/588,410

(22) Filed: Oct. 14, 2009

(65) Prior Publication Data
US 2010/0100653 A1   Apr. 22, 2010

(30) Foreign Application Priority Data
Oct. 17, 2008   (JP) .................. 2008-268308

(51) Int. Cl.
| | |
|---|---|
| G06F 5/00 | (2006.01) |
| H04N 5/775 | (2006.01) |
| G06F 3/023 | (2006.01) |
| G06F 3/038 | (2013.01) |
| G06F 1/16 | (2006.01) |

(52) U.S. Cl.
CPC .............. *H04N 5/775* (2013.01); *G06F 1/1632* (2013.01); *G06F 3/023* (2013.01); *G06F 3/038* (2013.01)

(58) Field of Classification Search
None
See application file for complete search history.

(56) References Cited

U.S. PATENT DOCUMENTS

| | | | | |
|---|---|---|---|---|
| 5,517,236 | A * | 5/1996 | Sergeant et al. | 348/143 |
| 8,427,421 | B2 * | 4/2013 | Lee | G06F 3/14 345/1.1 |
| 8,749,481 | B2 * | 6/2014 | Lee | G06F 3/023 345/1.1 |
| 2006/0116030 | A1* | 6/2006 | Niiyama et al. | 439/894 |
| 2008/0180397 | A1 | 7/2008 | Sakurai et al. | |
| 2009/0138737 | A1* | 5/2009 | Kim et al. | 713/322 |

FOREIGN PATENT DOCUMENTS

| | | |
|---|---|---|
| JP | 2005-18135 | 1/2005 |
| JP | 2006-180443 | 7/2006 |
| JP | 2008-186041 | 8/2008 |

OTHER PUBLICATIONS

Japanese Office Action issued Oct. 2, 2012 in corresponding Japanese Patent Application No. 2008-268308.

* cited by examiner

*Primary Examiner* — Henry Tsai
*Assistant Examiner* — Aurangzeb Hassan
(74) *Attorney, Agent, or Firm* — Staas & Halsey LLP (57) ABSTRACT

A video signal adjustment system that is capable of being connected between a server and a console includes: a server unit that is connected to the server; a main unit that is connected to the server unit, and includes a first adjustment portion that adjusts gain and frequency characteristic of a video signal output from the server; and a console unit that is connected between the main unit and the console, and includes a second adjustment portion that adjusts gain, frequency characteristic, and delay of the video signal output from the main unit.

15 Claims, 12 Drawing Sheets

GAIN ADJUSTMENT TABLE

| VOLTAGE SUPPLIED TO GAIN CONTROL PORT 551a | AMOUNT OF ATTENUATION OF GAIN ADJUSTMENT SIGNAL |
|---|---|
| V1 | 1.0 |
| ⋮ | ⋮ |
| Vj | 0.5 |
| ⋮ | ⋮ |
| Vn | 0.3 |

FIG. 6

FREQUENCY CHARACTERISTIC
ADJUSTMENT TABLE

| VOLTAGE SUPPLIED TO FREQUENCY CHARACTERISTIC ADJUSTMENT PORT 551b | 14MHz AMOUNT OF ATTENUATION | 90MHz AMOUNT OF ATTENUATION |
|---|---|---|
| V1 | 1.0 | 1.0 |
| ⋮ | ⋮ | ⋮ |
| Vj | 0.5 | 0.5 |
| ⋮ | ⋮ | ⋮ |
| Vn | 0.3 | 0.3 |

VIDEO SIGNAL ADJUSTMENT SYSTEM AND METHOD FOR CONTROLLING THE SAME

CROSS-REFERENCE TO RELATED APPLICATION

This application is based upon and claims the benefit of priority of the prior Japanese Patent Application No. 2008-268308, filed on Oct. 17, 2008, the entire contents of which are incorporated herein by reference.

FIELD

A certain aspect of the embodiments discussed herein is related to a video signal adjustment system and a method for controlling the same.

BACKGROUND

Conventionally, there has been known a KVM (K: keyboard, V: video, M: mouse) switch to which a plurality of servers and peripheral devices such as a keyboard, a mouse, and a monitor which input and output signals from/to the servers can be able to connected (see Japanese Laid-Open Patent Publication No. 2005-18135). The KVM switch can switch a server which a console such as the keyboard, the mouse, and the monitor accesses.

Conventionally, there has been known a KVM switch to which a plurality of servers and a plurality of consoles are connected in a many-to-many relationship.

The KVM switch causes the monitor to display a video signal from the server. However, when a distance between the KVM switch and the server or a distance between the KVM switch and the console is a long distance (e.g. 100 meters), attenuation, strain, and delay are caused in the image signal from the server, and a user may not obtain optimal video display.

Especially, in the KVM switch to which the servers and the consoles are connected, an output level of the video signal is different in each server, and hence the adjustment of the attenuation, the strain, and the delay of each video signal is not easy.

SUMMARY

It is an object of the present invention to provide a video signal adjustment system and a method for controlling the same that can obtain an optimal video even if a distance between a server and a console is a long distance.

According to a first aspect of the present invention, there is provided a video signal adjustment system that is capable of being connected between a server and a console, including: a server unit that is connected to the server; a main unit that is connected to the server unit, and includes a first adjustment portion that adjusts gain and frequency characteristic of a video signal output from the server; and a console unit that is connected between the main unit and the console, and includes a second adjustment portion that adjusts gain, frequency characteristic, and delay of the video signal output from the main unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will now be given, with reference to the accompanying drawings, of an embodiment of the present invention.

Figure 1:
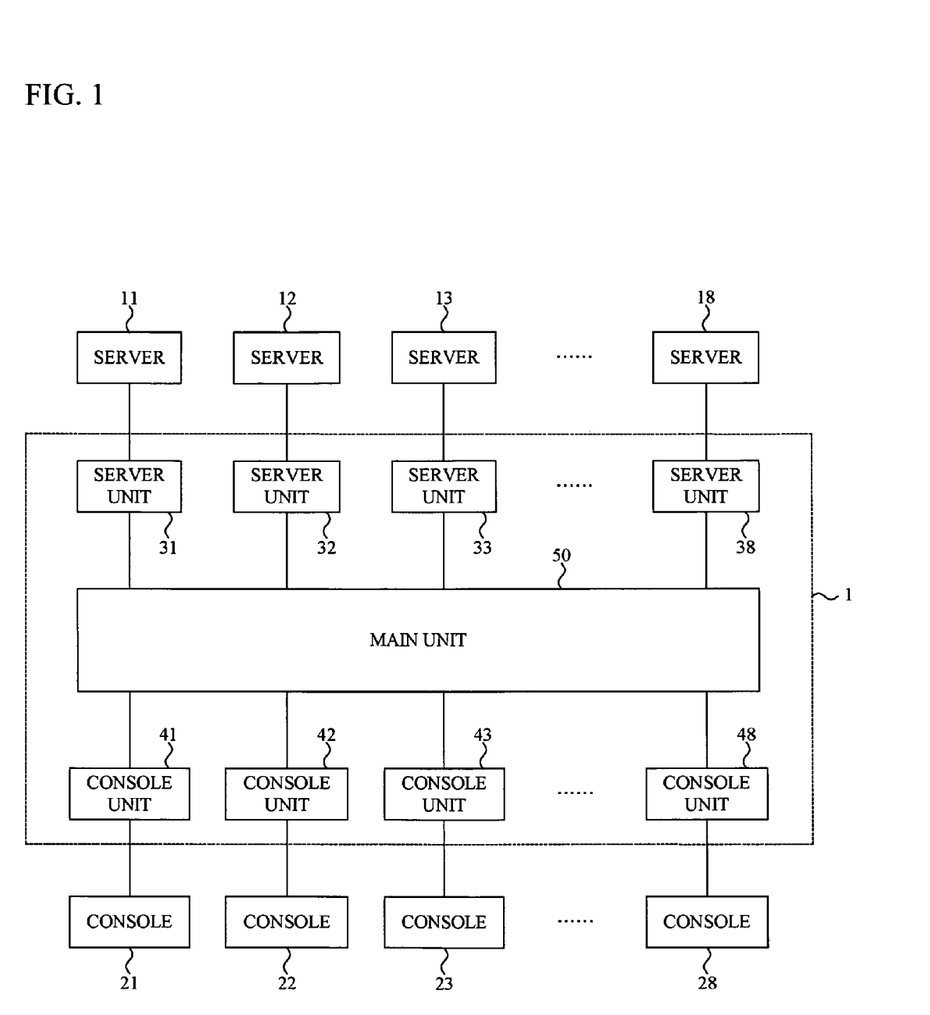
FIG. 1 is a schematic diagram showing the basic construction of a video signal adjustment system according to a present embodiment.

FIG. 1 is a schematic diagram showing the basic construction of a video signal adjustment system according to a present embodiment.

The video signal adjustment system in FIG. 1 includes servers 11 to 18, a KVM switch 1, and consoles 21 to 28. The KVM switch 1 is a multiuser KVM switch that can connect up to 8 sets of the server and the console. Each of the consoles 21 to 28 includes a monitor, a keyboard, and a mouse. Hereinafter, the monitor is represented by adding a sign "a" to a reference number of the corresponding console, and the keyboard and the mouse are represented by adding a sign "b" to a reference number of the corresponding console.

The KVM switch 1 includes server units 31 to 38, a main unit 50, and console units 41 to 48. The server units 31 to 38 are connected to the servers 11 to 18, respectively, and the console units 41 to 48 are connected to the consoles 21 to 28, respectively. Cables with a length of about 100 meters are connected between the server units 31 to 38 and the main unit 50, and cables with a length of about 300 meters are connected between the console units 41 to 48 and the main unit 50.

The main unit 50 in the KVM switch 1 selectively switches a set of console operating one server to other set of console. That is, one server receives data of the mouse, the keyboard, or a touch panel from one set of console, and an RGB signal from the server is output to the monitor included in the console.

Although in the present embodiment, the KVM switch 1 is separated to the server units 11 to 18, the main unit 50, and the console units 31 to 38, any one of the console units 11 to 18 or the server units 31 to 38, or both of them may be integrated with the main unit 50.

Figure 2:
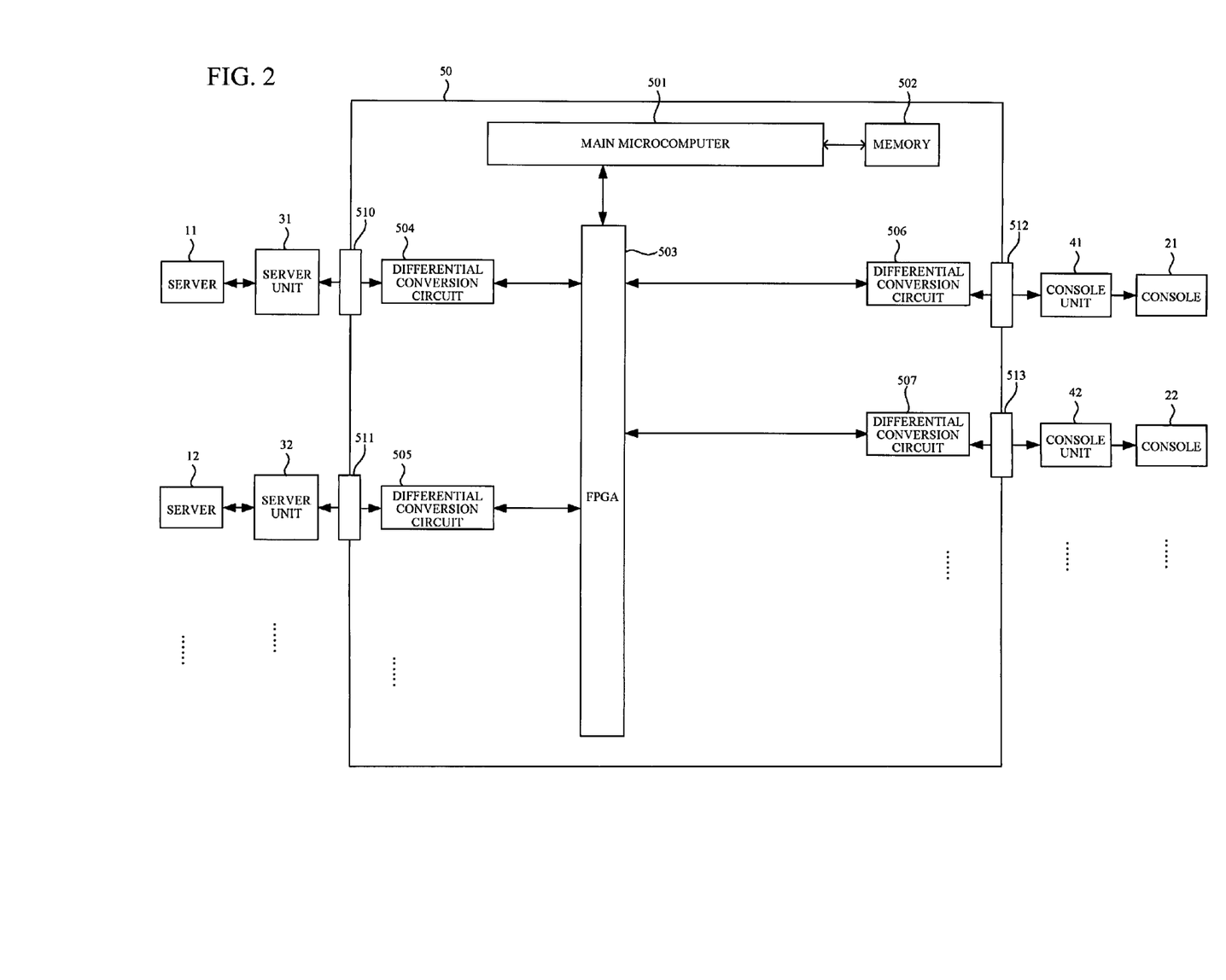
FIG. 2 is a diagram showing the basic construction of a main unit 50 relating to a keyboard/mouse signal.

FIG. 2 is a diagram showing the basic construction of the main unit 50 relating to a keyboard/mouse signal;

The main unit 50 includes a main microcomputer 501, a memory 502, FPGA (Field Programmable Gate Array) 503, differential conversion circuits 504 to 507, and connection ports 510 to 513. The number of differential conversion circuits and connection ports is not limited to this. The main unit 50 may include more differential conversion circuits and more connection ports. The main microcomputer 501 is connected to the memory 502 and the FPGA 503. The FPGA 503 is connected to the differential conversion circuits 504 to 507. The differential conversion circuits 504 to 507 are connected to the connection ports 510 to 513, respectively.

The main microcomputer 501 controls the entire main unit 50. The memory 502 stores various data, data on a setting screen of an OSD (On-Screen Display) function, and so on. The FPGA 503 is composed of a LSI (Large-Scale Integration) that can be operated by a program, and switches a destination of output of serial data as the keyboard/mouse signal.

The differential conversion circuits 504 and 505 convert the serial data from the FPGA 503 into the differential signals, and output the differential signals to the servers 11 and 12 via the connection ports 501 and 511, and the server units 31 and 32, respectively. The differential conversion circuits 506 and 507 receive the differential signals as the keyboard/mouse signals via the console units 41 and 42, and the connection ports 512 and 513, converts the differential signals into the serial data, and outputs the serial data to the FPGA 503.

Figure 3:
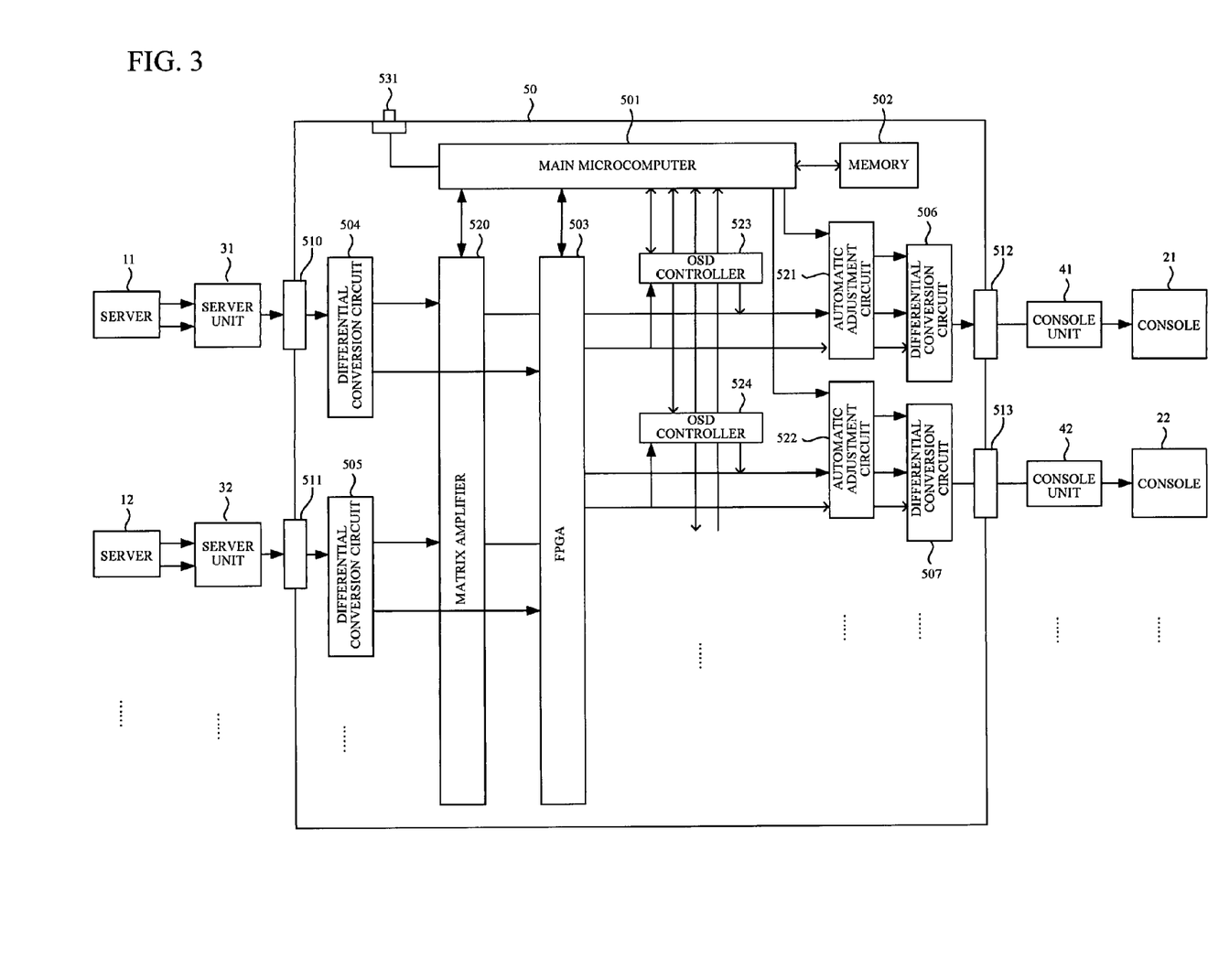
FIG. 3 is a diagram showing the basic construction of the main unit 50 relating to a video signal.

FIG. 3 is a diagram showing the basic construction of the main unit 50 relating to a video signal. It should be noted that the same numeral numbers are added to the same elements as elements of FIG. 2.

The main unit 50 includes the main microcomputer 501, the memory 502 (a first storage), the FPGA 503, the differential conversion circuits 504 to 507, the connection ports 510 to 513, a matrix amplifier 520, automatic adjustment circuits 521 and 522, OSD controllers 523 and 524, and a switch 531 (a first switch). The main microcomputer 501, the memory 502, and the automatic adjustment circuits 521 and 522 correspond to a first adjustment portion.

The number of differential conversion circuits, connection ports, OSD controllers, and automatic adjustment circuits is limited to this. The main unit 50 may includes more differential conversion circuits, more connection ports, more OSD controllers, and more automatic adjustment circuits. The connection ports 510 and 511 are connected to the differential conversion circuits 504 and 505, respectively. Each of the differential conversion circuits 504 and 505 is connected to the matrix amplifier 520 and the FPGA 503. The main microcomputer 501 is connected to the memory 502, the FPGA 503, the matrix amplifier 520, the automatic adjustment circuits 521 and 522, and the OSD controllers 523 and 524. The automatic adjustment circuits 521 and 522 are connected to the differential conversion circuits 506 and 507, respectively.

The main microcomputer 501 controls the entire main unit 50. The memory 502 stores various data, data on the setting screen of the OSD (On-Screen Display) function, and so on. The FPGA 503 is composed of a LSI (Large-Scale Integration) that can be operated by the program, and switches a destination of output of a horizontal synchronizing signal and a vertical synchronizing signal.

The matrix amplifier 520 switches a destination of output of an RGB signal. The OSD controllers 523 and 524 output screen data on the OSD function to the differential conversion circuits 506 and 507, respectively.

The differential conversion circuits 504 and 505 receive the RGB signals with which the horizontal synchronizing signals and the vertical synchronizing signals are combined, from the server units 31 and 32, respectively, and each of them separates the combined RGB signal into the horizontal synchronizing signal and the vertical synchronizing signal, and the RGB signal. The separated horizontal synchronizing signal and the separated vertical synchronizing signal are output to the FPGA 503, and the separated RGB signal is output to the matrix amplifier 520. The automatic adjustment circuits 521 and 522 automatically adjust the gain and the frequency characteristic of the RGB signal. When the switch 531 is depressed or an instruction of the automatic adjustment is input in the setting screen of the OSD, the main microcomputer 501 causes the automatic adjustment circuits 521 and 522 to automatically adjust the gain and the frequency characteristic of the RGB signal.

Each of the differential conversion circuits 506 and 507 combines the horizontal synchronizing signal and the vertical synchronizing signal with the RGB signal, and the differential conversion circuits 506 and 507 output the combined RGB signals to the console units 41 and 42 via the connection ports 512 and 513, respectively.

Figure 4:
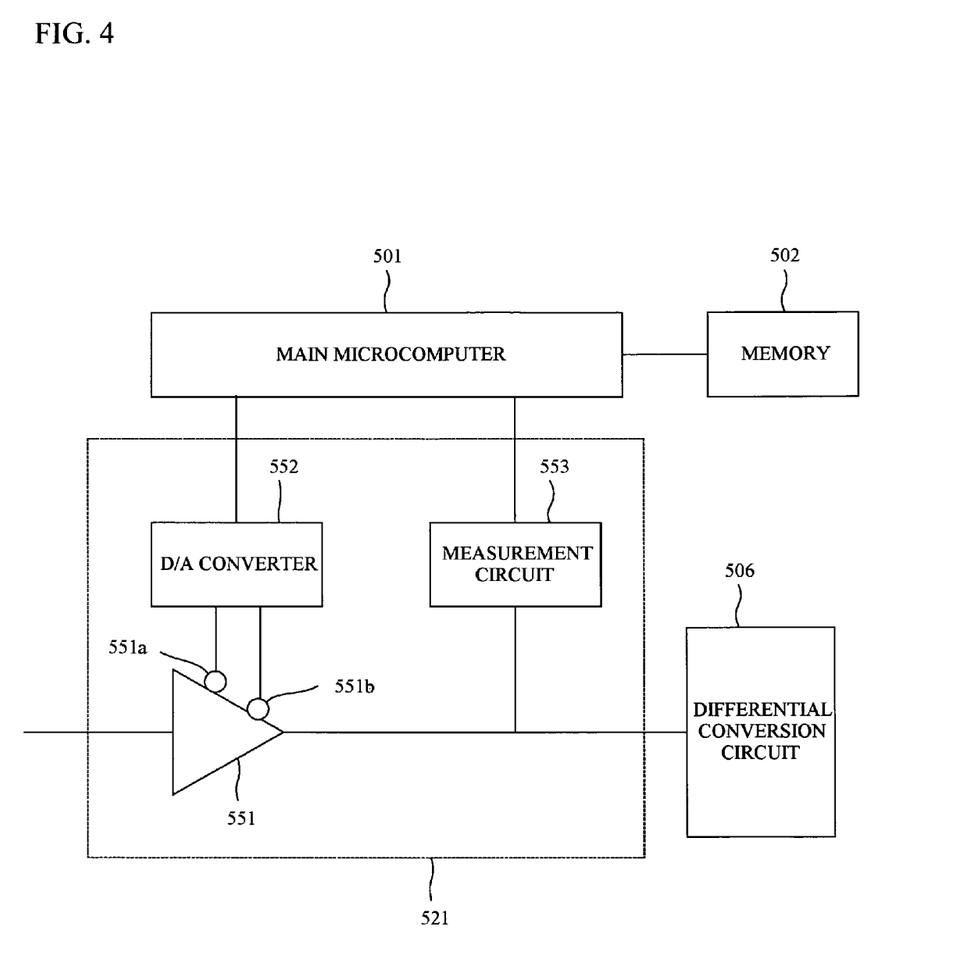
FIG. 4 is a schematic diagram showing the construction of an automatic adjustment circuit 521.

FIG. 4 is a schematic diagram showing the construction of the automatic adjustment circuit 521. The construction of the automatic adjustment circuit 522 is the same as that of the automatic adjustment circuit 521, and hence a description thereof is omitted.

The automatic adjustment circuit 521 includes a receiver 551, a D/A (digital-to-analog) converter 552, and a measurement circuit 553. The receiver 551 includes a gain control port 551a and a frequency characteristic adjustment port 551b. Voltages are supplied from the D/A converter 552 by the control of the main microcomputer 501 to these port. The receiver 551 adjusts the gain of the RGB signal depending on the voltage supplied to the gain control port 551a, and adjusts the frequency characteristic of the RGB signal depending on the voltage supplied to the frequency characteristic adjustment port 551b.

Next, the adjustment of the gain will be described in detail.

When an adjustment instruction of the gain is input from the main unit 50 to the server 11, a gain adjustment signal which is a constant voltage signal is input from the server 11 to the main unit 50. The measurement circuit 553 measures the voltage of the gain adjustment signal, and calculates an amount of attenuation of the gain adjustment signal. For example, when the gain adjustment signal is the constant voltage signal of 5 volts, and a measurement value of the voltage of the gain adjustment signal is 4 volts, the amount of attenuation of the gain adjustment signal becomes 20% (i.e., 0.2).

Figure 5:
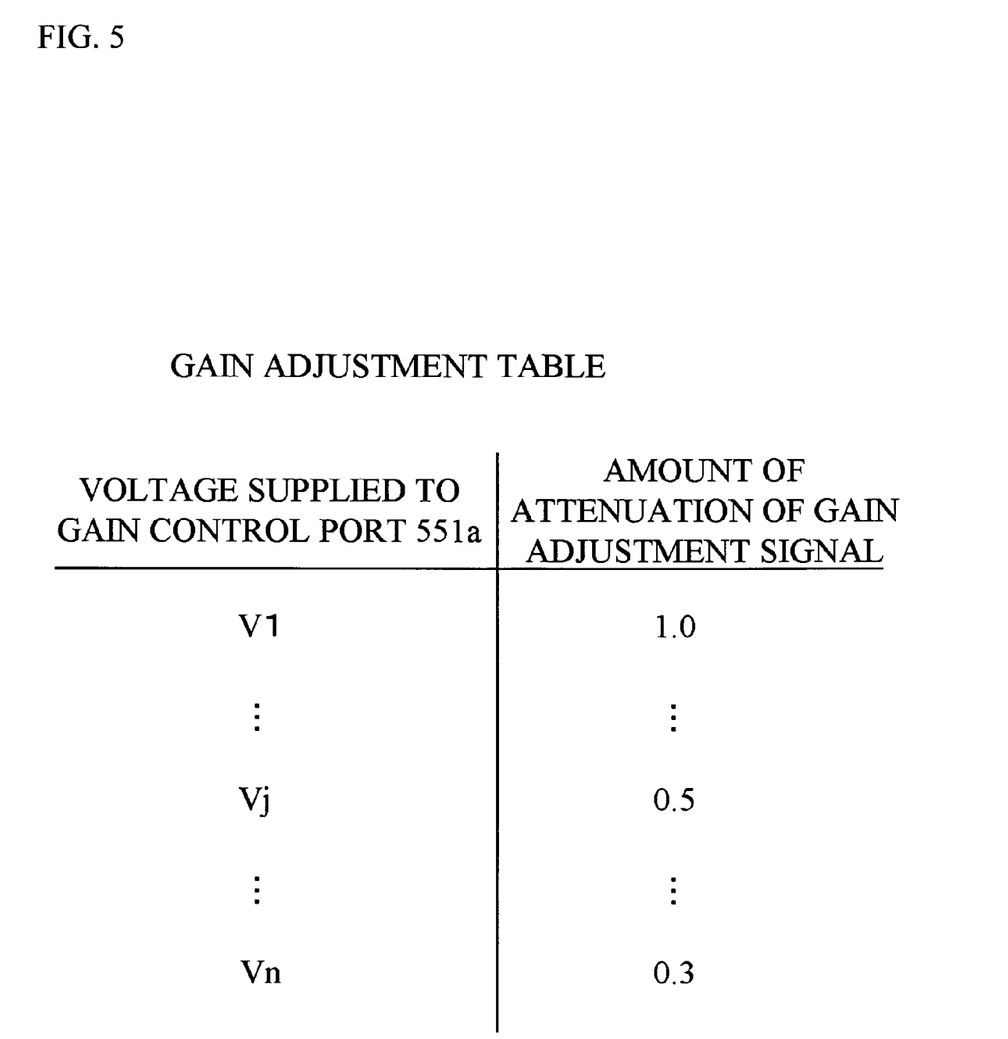
FIG. 5 is a diagram showing an example of a gain adjustment table.

The main microcomputer 501 decides the voltage supplied to the gain control port 551a of the receiver 551, based on the amount of attenuation calculated by the measurement circuit 553, and a gain adjustment table of FIG. 5 stored into the memory 502. The D/A converter 552 supplies the voltage decided by the main microcomputer 501 to the gain control port 551a. Thereby, the gain of the RGB signal to be received is adjusted.

Next, the adjustment of the frequency characteristic will be described in detail.

When an adjustment instruction of the frequency characteristic is input from the main unit 50 to the server 11, frequency characteristic adjustment signals of 14 MHz and 90 MHz are input from the server 11 to the main unit 50. The measurement circuit 553 measures the voltages of the frequency characteristic adjustment signals of 14 MHz and 90 MHz, and calculates the amounts of attenuation of the frequency characteristic adjustment signals.

Figure 6:
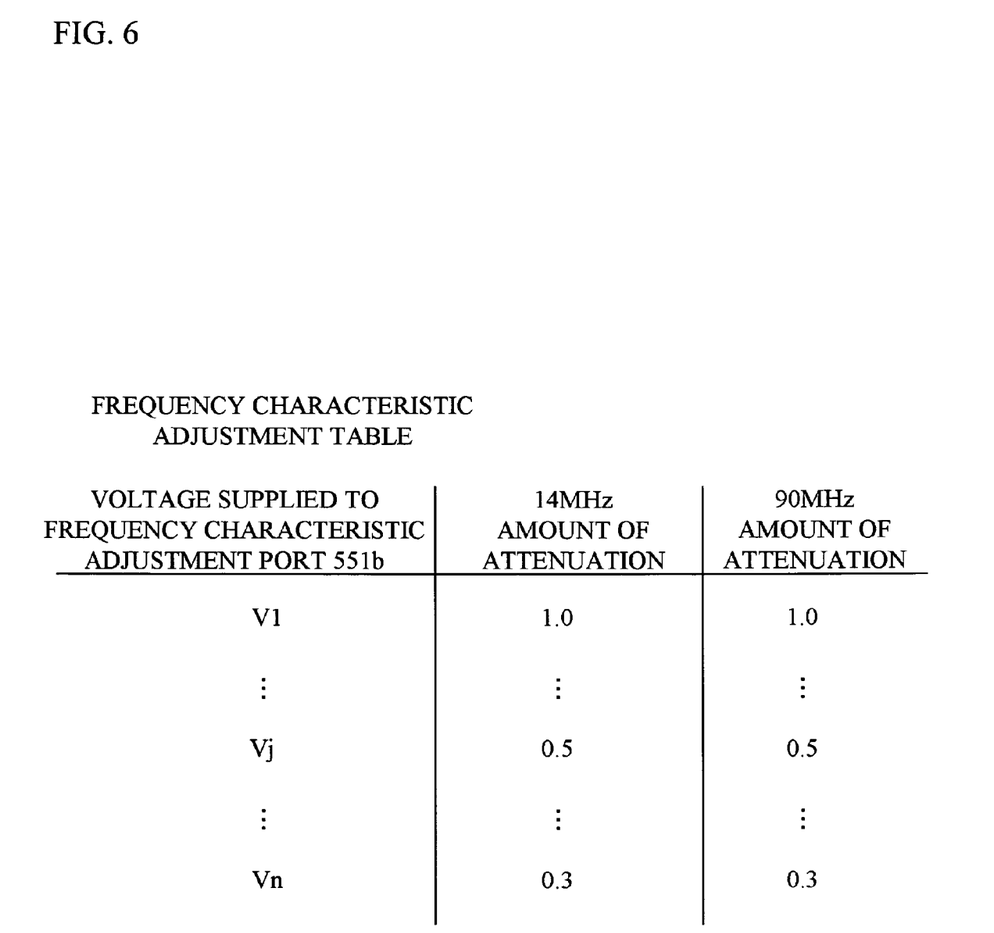
FIG. 6 is a diagram showing an example of a frequency characteristic adjustment table.

The main microcomputer 501 decides the voltage supplied to the frequency characteristic adjustment port 551*b*, based on the amounts of attenuation calculated by the measurement circuit 553, and a frequency characteristic adjustment table of FIG. 6 stored into the memory 502. The D/A converter 552 supplies the voltage decided by the main microcomputer 501 to the frequency characteristic adjustment port 551*b*. Thereby, the frequency characteristic of the RGB signal to be received is adjusted. The adjustment of the gain and the frequency characteristic is executed for each of transmission lines of an R-signal, a G-signal, and a B-signal.

The main microcomputer 501 stores information on the voltages supplied to the gain control port 551*a* and the frequency characteristic adjustment port 551*b* for each server into the memory 502. Thereby, when switching the server is executed, the automatic adjustment circuit 521 receives the information on the voltages supplied to the gain control port 551*a* and the frequency characteristic adjustment port 551*b*, which corresponds to a selected server, from the memory 502 via the main microcomputer 501, to thereby automatically adjust the gain and the frequency characteristic of the RGB signal with rapidity.

Figure 7:
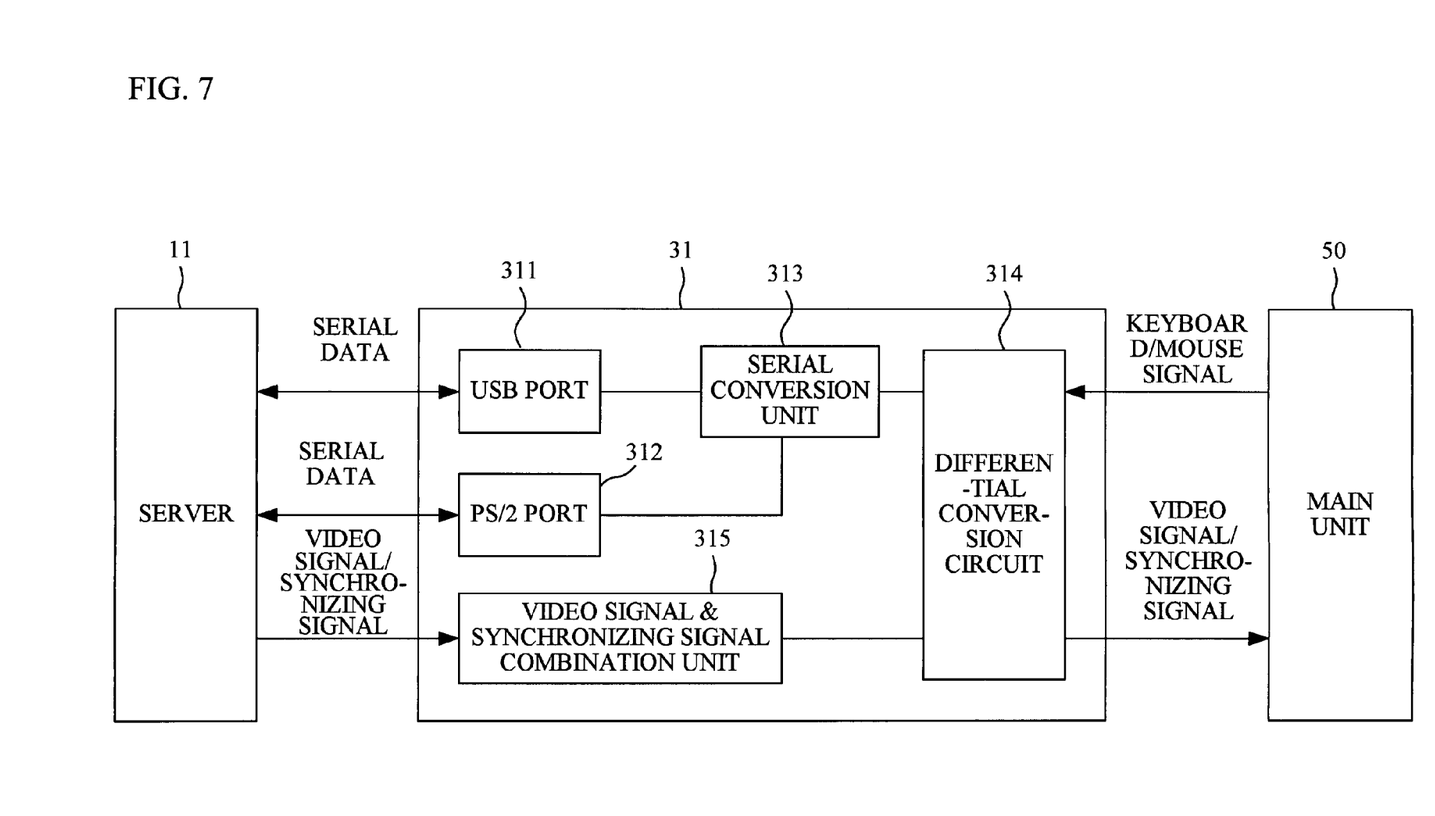
FIG. 7 is a schematic diagram showing the construction of a server unit 31.

FIG. 7 is a schematic diagram showing the construction of the server unit 31. Each of the server units 32 to 38 has the same construction as the server unit 31.

The server unit 31 includes a USB (Universal Serial Bus) port 311, a PS/2 port 312, a serial conversion unit 313, a differential conversion circuit 314, and a video signal & synchronizing signal combination unit 315. The USB port 311 and the PS/2 port 312 are connected to the serial conversion unit 313, and the differential conversion circuit 314 is connected to the serial conversion unit 313 and the video signal & synchronizing signal combination unit 315.

The USB port 311 transmits the keyboard/mouse signal as serial data to a USB port, not shown, of the server 11. The PS/2 port 312 transmits the keyboard/mouse signal as serial data to a PS/2 port, not shown, of the server 11. The serial conversion unit 313 receives the keyboard/mouse signal as a differential signal, converts the keyboard/mouse signal into the serial data, and outputs the serial data to the USB port 311 or the PS/2 port 312.

The video signal & synchronizing signal combination unit 315 receives the RGB signal, the horizontal synchronizing signal, and the vertical synchronizing signal from the server 11, combines the horizontal synchronizing signal and the vertical synchronizing signal with the RGB signal, and outputs the combined RGB signal to the differential conversion circuit 314. The differential conversion circuit 314 receives the keyboard/mouse signal as the differential signal from the main unit 50, outputs the keyboard/mouse signal to the serial conversion unit 313, and outputs the RGB signal with which the horizontal synchronizing signal and the vertical synchronizing signal are combined, to the main unit 50.

Figure 8:
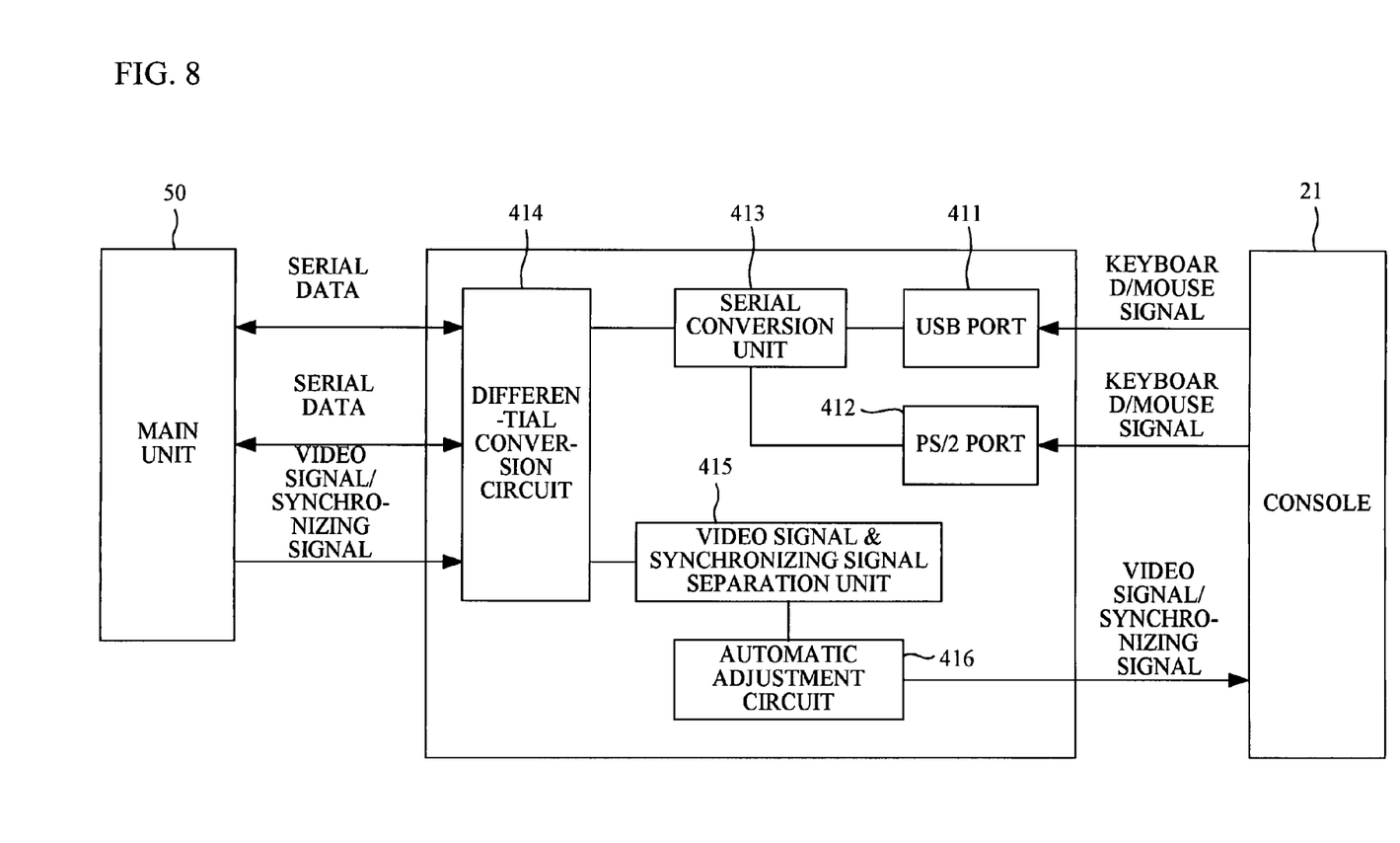
FIG. 8 is a schematic diagram showing the construction of a console unit 41.

FIG. 8 is a schematic diagram showing the construction of the console unit 41. Each of the console units 42 to 48 has the same construction as the console unit 41.

The console unit 41 includes a USB port 411, a PS/2 port 412, a serial conversion unit 413, a differential conversion circuit 414, a video signal & synchronizing signal separation unit 415, and an automatic adjustment circuit 416 (a second adjustment portion). The USB port 411 and PS/2 port 412 are connected to the serial conversion unit 413, and the differential conversion circuit 414 is connected to the serial conversion unit 413 and the video signal & synchronizing signal separation unit 415. The video signal & synchronizing signal separation unit 415 is connected to the automatic adjustment circuit 416.

The USB port 411 and the PS/2 port 412 receive the keyboard/mouse signal from the console 21. The serial conversion unit 413 converts the keyboard/mouse signal from the USB port 411 or the PS/2 port 412 into the serial data, and transmits the serial data to the differential conversion circuit 414.

The differential conversion circuit 414 converts the serial data received from the serial conversion unit 413 into the differential signal, and outputs the differential signal to the main unit 50. The differential conversion circuit 414 receives the RGB signal with which the horizontal synchronizing signal and the vertical synchronizing signal are combined, from the main unit 50, and transmits the combined RGB signal to the video signal & synchronizing signal separation unit 415.

The video signal & synchronizing signal separation unit 415 separates the RGB signal, with which the horizontal synchronizing signal and the vertical synchronizing signal are combined, received from the differential conversion circuit 414 into the RGB signal, and the horizontal synchronizing signal and the vertical synchronizing signal. The video signal & synchronizing signal separation unit 415 transmits the separated RGB signal, the separated horizontal synchronizing signal, and the separated vertical synchronizing signal to the automatic adjustment circuit 416. The automatic adjustment circuit 416 automatically adjusts the gain, the equalizer, and the delay of the RGB signal, and outputs the adjusted RGB signal, the horizontal synchronizing signal, and the vertical synchronizing signal to the console 21.

Figure 9:
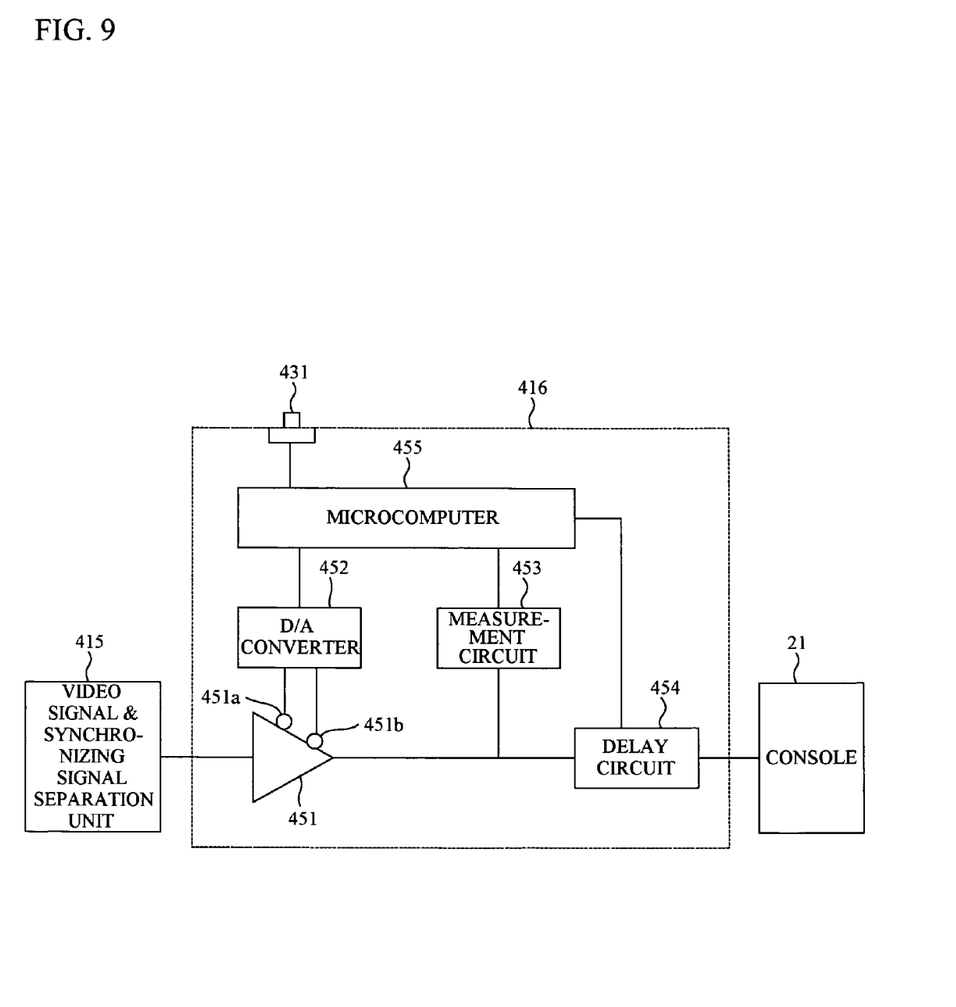
FIG. 9 is a schematic diagram showing the construction of an automatic adjustment circuit 416.

FIG. 9 is a schematic diagram showing the construction of the automatic adjustment circuit 416.

The automatic adjustment circuit 416 includes a receiver 451, a D/A (Digital-to-Analog) converter 452, a measurement circuit 453, a delay circuit 454, a microcomputer 455 (a second storage), and a switch 431 (a second switch). The receiver 451 includes a gain control port 451*a* and a frequency characteristic adjustment port 451*b*. Voltages are supplied from the D/A converter 452 by the control of the microcomputer 455 to these port. The receiver 451 adjusts the gain of the RGB signal depending on the voltage supplied to the gain control port 451*a*, and adjusts the frequency characteristic of the RGB signal depending on the voltage supplied to the frequency characteristic adjustment port 451*b*.

Next, the adjustment of the gain will be described in detail.

When the switch 431 is depressed or an instruction of the automatic adjustment is input in the setting screen of the OSD, the microcomputer 455 outputs an adjustment instruction of the gain and the frequency characteristic to the server 11. When the adjustment instruction of the gain is input to the server 11 via the main unit 50, a gain adjustment signal which is a constant voltage signal is input from the server 11 to the automatic adjustment circuit 416 of the server unit 41 via the main unit 50. The measurement circuit 453 measures the voltage of the gain adjustment signal, and calculates an amount of attenuation of the gain adjustment signal. For example, when the gain adjustment signal is the constant voltage signal of 5 volts, and a measurement value of the voltage of the gain adjustment signal is 4 volts, the amount of attenuation of the gain adjustment signal becomes 20% (i.e., 0.2).

The microcomputer 455 decides the voltage supplied to the gain control port 451*a* of the receiver 451, based on the amount of attenuation calculated by the measurement circuit 453, and a gain adjustment table stored into the microcomputer 455. The gain adjustment table stored into the microcomputer 455 is the same as the gain adjustment table of FIG. 5.

The D/A converter 452 supplies the voltage decided by the microcomputer 455 to the gain control port 451a. Thereby, the gain of the RGB signal to be received is adjusted.

Next, the adjustment of the frequency characteristic will be described in detail.

When the switch 431 is depressed or the instruction of the automatic adjustment is input in the setting screen of the OSD, the microcomputer 455 outputs the adjustment instruction of the gain and the frequency characteristic to the server 11. When the adjustment instruction of the frequency characteristic is input to the server 11 via the main unit 50, the frequency characteristic adjustment signals of 14 MHz and 90 MHz are input from the server 11 to the server unit 41 via the main unit 50.

The measurement circuit 453 measures the voltages of the frequency characteristic adjustment signals of 14 MHz and 90 MHz, and calculates the amounts of attenuation of the frequency characteristic adjustment signals. The microcomputer 455 decides the voltage supplied to the frequency characteristic adjustment port 451b, based on the amounts of attenuation calculated by the measurement circuit 453, and a frequency characteristic adjustment table stored into the microcomputer 455. The frequency characteristic adjustment table stored into the microcomputer 455 is the same as the frequency characteristic adjustment table of FIG. 6.

The D/A converter 452 supplies the voltage decided by the microcomputer 455 to the frequency characteristic adjustment port 551b. Thereby, the frequency characteristic of the RGB signal to be received is adjusted. The adjustment of the gain and the frequency characteristic is executed for each of transmission lines of the R-signal, the G-signal, and the B-signal.

Next, the adjustment of the delay of the RGB signal will be described in detail.

First, when the switch 431 is depressed or the instruction of the automatic adjustment is input in the setting screen of the OSD, the microcomputer 455 outputs the adjustment instruction of the delay to the server 11. When the adjustment instruction of the delay is input to the server via the main unit 50, the RGB signal is input from the server to the server unit 41 via the main unit 50.

The measurement circuit 453 selects any one of the R-signal the G-signal, and the B-signal as a reference signal, and measures the delay of other video signals (e.g. the G-signal and the B-signal) to the reference signal (e.g. the R-signal). The measurement circuit 453 transmits a result of the measurement to the microcomputer 455. The microcomputer 455 causes the delay circuit 454 to adjust the delay of the video signal, based on the result of the measurement. Thereby, the delay between the R-signal, the G-signal, and the B-signal is eliminated.

The microcomputer 455 stores information on the voltages supplied to the gain control port 451a and the frequency characteristic adjustment port 451b, and the measurement result of the delay of the other video signals to the reference signal for each server into a memory (not shown) in the microcomputer 455. Thereby, when switching the server is executed, the microcomputer 455 can automatically adjust the gain, the frequency characteristic, and the delay of the RGB signal with rapidity by reading out the information and the measurement result from the memory.

Figure 10:
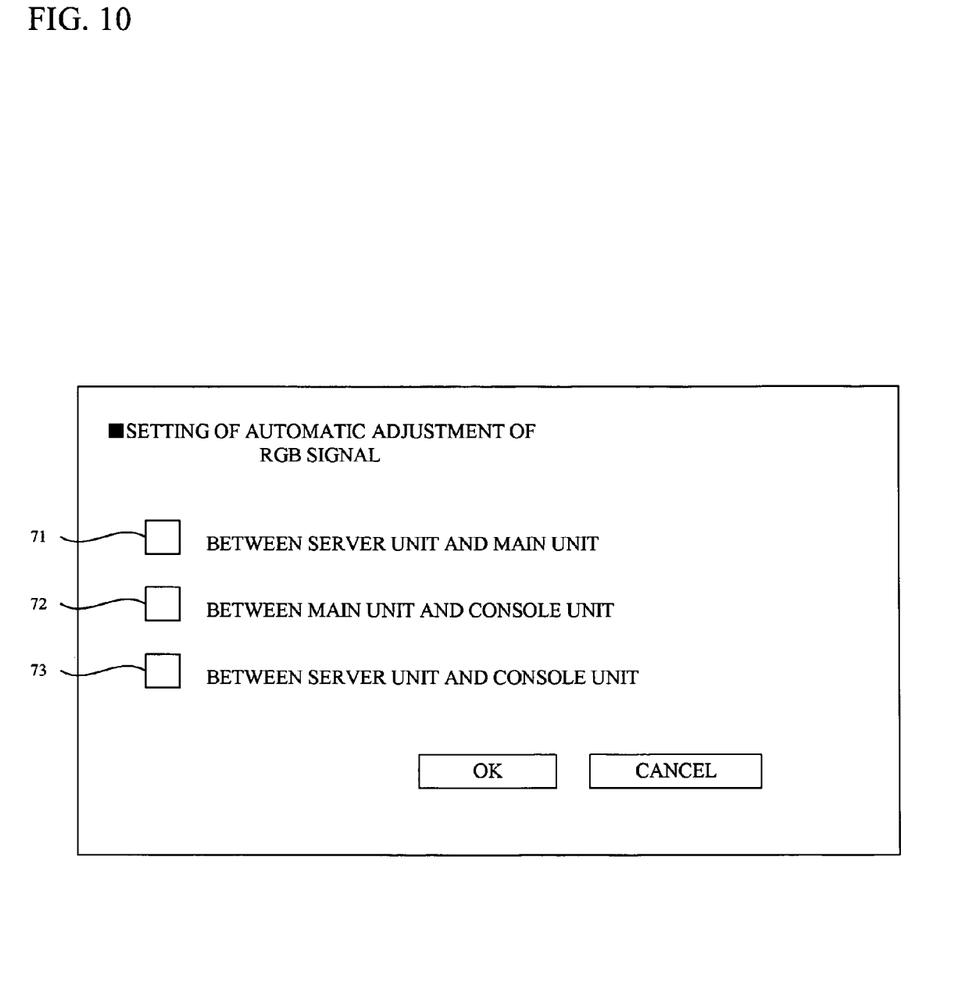
FIG. 10 is a schematic diagram showing an example of a setting screen of OSD (On-Screen Display) displayed on a monitor of the console unit 41.

FIG. 10 is a schematic diagram showing an example of the setting screen of the OSD displayed on the monitor of the console unit 41. A section where the RGB signal is adjusted is set on this setting screen.

When a check box 71 is checked and an "OK" button is depressed, the automatic adjustment circuits 521 and 522 included in the main unit 50 automatically adjust the gain and the frequency characteristic of the RGB signal as in the case where the switch 531 of FIG. 3 is depressed. When a check box 72 is checked and the "OK" button is depressed, the automatic adjustment circuit 416 included in the console unit 41 automatically adjust the gain, the frequency characteristic, and the delay of the RGB signal as in the case where the switch 431 of FIG. 9 is depressed. When a check box 73 is checked and the "OK" button is depressed, the automatic adjustment circuits 521 and 522 automatically adjust the gain and the frequency characteristic of the RGB signal, and the automatic adjustment circuit 416 automatically adjust the gain, the frequency characteristic, and the delay of the RGB signal. In this case, the gain, the frequency characteristic, and the delay of the RGB signal transmitted from the server unit to the console unit can be automatically and collectively adjusted.

Figure 11:
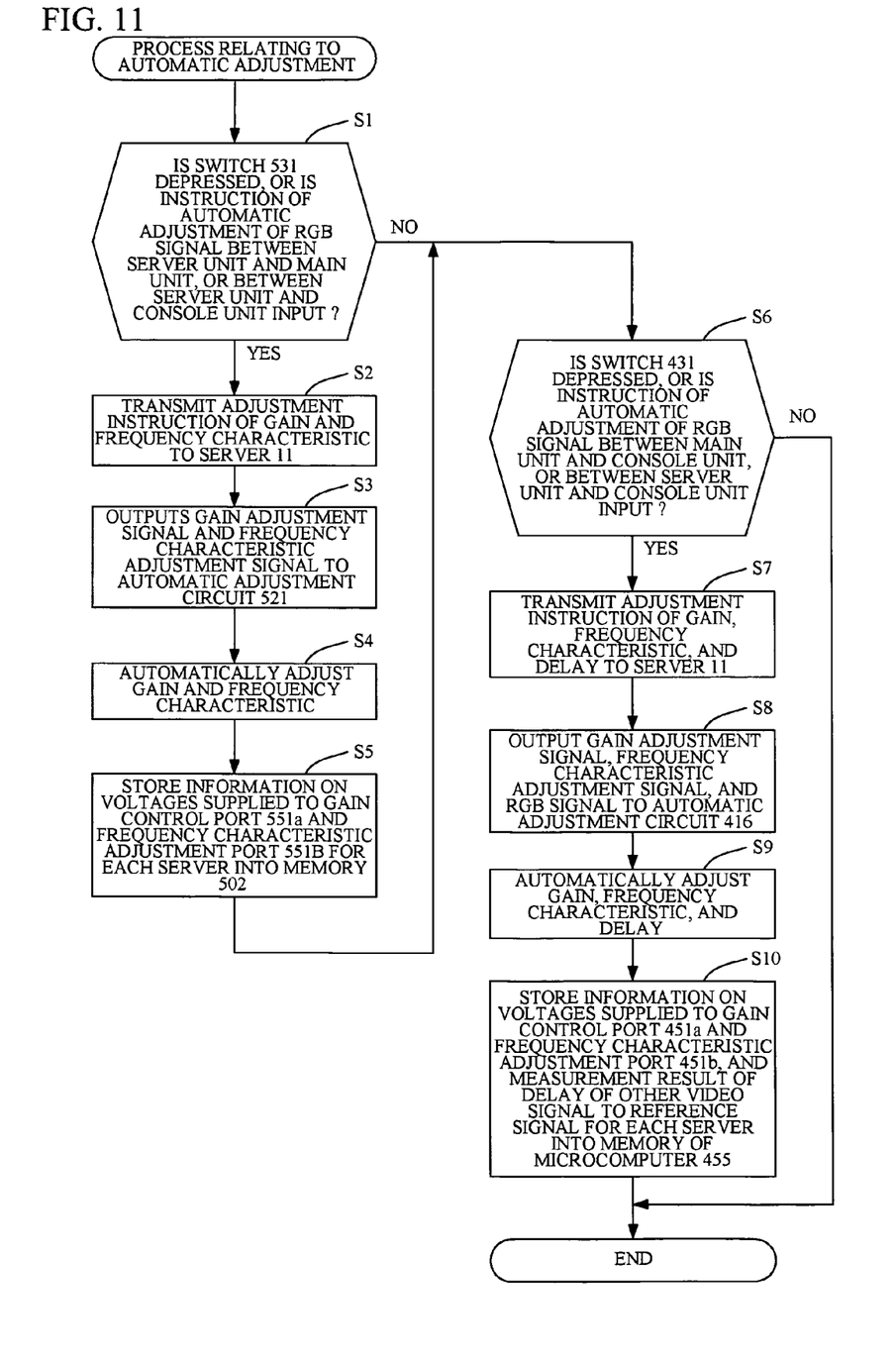
FIG. 11 is a flowchart showing a process relating to automatic adjustment executed by the video signal adjustment system.

FIG. 11 is a flowchart showing a process relating to automatic adjustment executed by the video signal adjustment system. Here, although the server 11 is used as the representation of the server, the server unit 31 is used as the representation of the server unit, and the console unit 41 is used as the representation of the console unit, the present process is applied to all servers and all console units.

First, the main microcomputer 501 determines whether the switch 531 is depressed, or an instruction of the automatic adjustment of the RGB signal between the server unit and the main unit, or between the server unit and the console unit is input (step S1).

When the answer to the determination of step S1 is "NO", the procedure proceeds to step S6 as described later. When the answer to the determination of step S1 is "YES", the main microcomputer 501 transmits the adjustment instruction of the gain and the frequency characteristic to the server 11 to which the console 21 is connected, via the main unit 50 (step S2). The server 11 outputs the gain adjustment signal and the frequency characteristic adjustment signal to the automatic adjustment circuit 521 of the main unit 50 (step S3).

The automatic adjustment circuit 521 automatically adjusts the gain and the frequency characteristic by using the gain adjustment signal and the frequency characteristic adjustment signal (step S4). At this time, the main microcomputer 501 stores the information on the voltages supplied to the gain control port 551a and the frequency characteristic adjustment port 551b for each server into the memory 502 (step S5). The procedure then proceeds to step S6.

Next, the microcomputer 455 determines whether the switch 431 is depressed, or an instruction of the automatic adjustment of the RGB signal between the main unit and the console unit, or between the server unit and the console unit is input (step S6).

When the answer to the determination of step S6 is "NO", the present process is terminated. When the answer to the determination of step S6 is "YES", the microcomputer 455 transmits an adjustment instruction of the gain, the frequency characteristic, and the delay to the server 11 to which the console 11 is connected, via the main unit 50 (step S7). The server 11 outputs the gain adjustment signal, the frequency characteristic adjustment signal, and the RGB signal to the automatic adjustment circuit 416 via the main unit 50 (step S8).

The automatic adjustment circuit 416 automatically adjusts the gain, the frequency characteristic, and the delay by using the gain adjustment signal, the frequency characteristic adjustment signal, and the RGB signal (step S9). At this time, the microcomputer 455 stores the information on the voltages supplied to the gain control port 451a and the frequency characteristic adjustment port 451b, and the measurement result of the delay of the other video signal to the reference signal for each server into the memory (not shown) of the microcomputer 455 (step S10). The present process is terminated.

Figure 12:
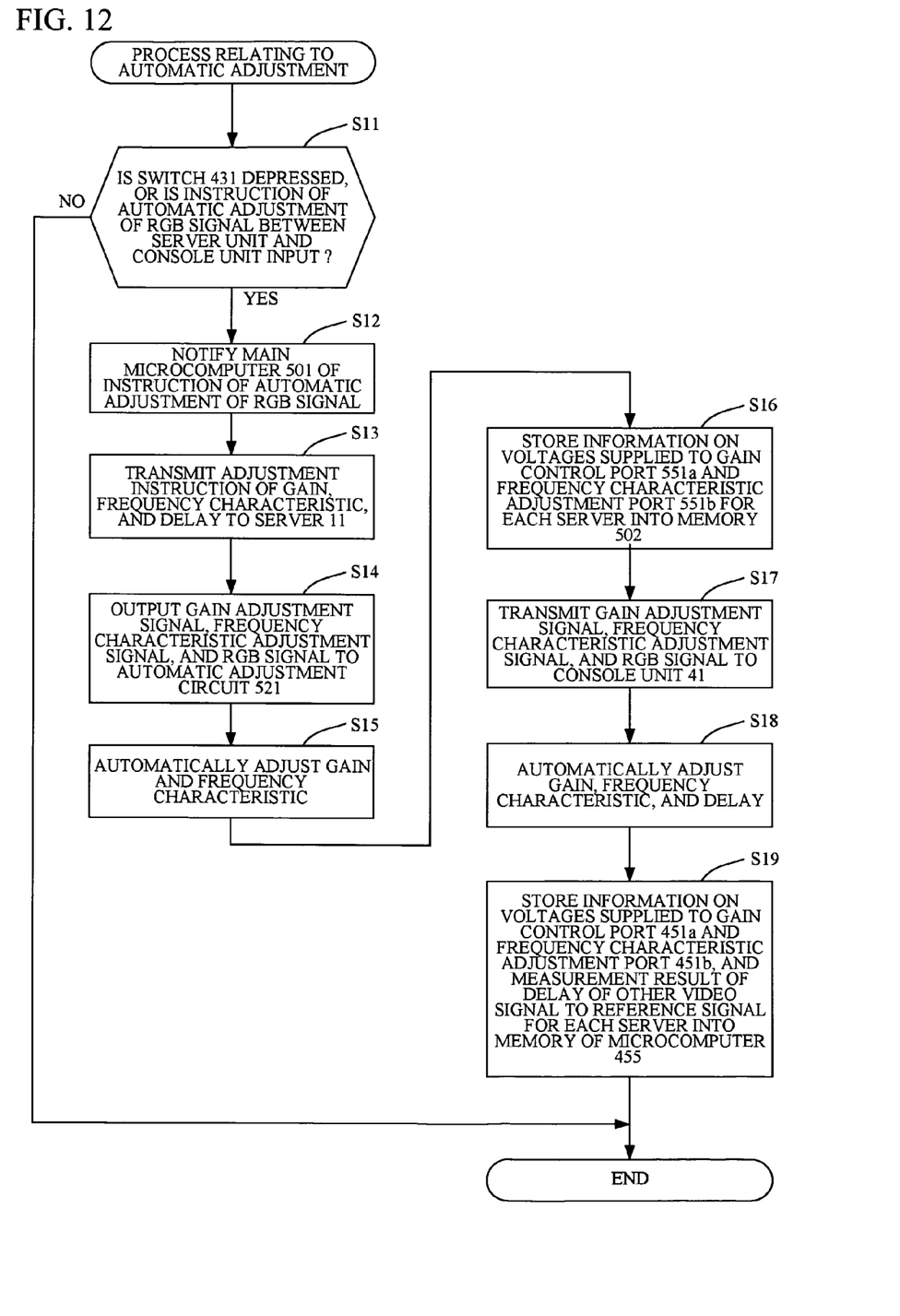
FIG. 12 is a flowchart showing variation of the process relating to automatic adjustment executed by the video signal adjustment system.

FIG. 12 is a flowchart showing variation of the process relating to automatic adjustment executed by the video signal adjustment system. Here, although the server 11 is used as the representation of the server, the server unit 31 is used as the representation of the server unit, and the console unit 41 is used as the representation of the console unit, the present process is applied to all servers and all console units.

First, the microcomputer 455 determines whether the switch 431 is depressed, or an instruction of the automatic adjustment of the RGB signal between the server unit and the console unit is input (step S11).

When the answer to the determination of step S11 is "NO", the present process is terminated. When the answer to the determination of step S11 is "YES", the microcomputer 455 notifies the main microcomputer 501 in the main unit 50 of an instruction of the automatic adjustment of the RGB signal (step S12). The microcomputer 455 transmits an adjustment instruction of the gain, the frequency characteristic, and the delay to the server 11 to which the console 21 is connected, via the main unit 50 (step S13). The server 11 outputs the gain adjustment signal, the frequency characteristic adjustment signal, and the RGB signal to the automatic adjustment circuit 521 of the main unit 50 (step S14).

The automatic adjustment circuit 521 automatically adjusts the gain and the frequency characteristic by using the gain adjustment signal, and the frequency characteristic adjustment signal (step S15). Thereby, it is possible to adjust the gain and the frequency characteristic of the RGB signal transmitted between the server 11 and the main unit 50. At this time, the main microcomputer 501 stores the information on the voltages supplied to the gain control port 551a and the frequency characteristic adjustment port 551b for each server into the memory 502 (step S16).

Next, the automatic adjustment circuit 521 transmits the gain adjustment signal, the frequency characteristic adjustment signal, and the RGB signal to the console unit 41 via the differential conversion circuit 506 (step S17). The automatic adjustment circuit 416 of the console unit 41 automatically adjusts the gain, the frequency characteristic, and the delay by using the received gain adjustment signal, the received frequency characteristic adjustment signal, and the received RGB signal (step S18). Thereby, it is possible to adjust the gain, the frequency characteristic, and the delay of the RGB signal transmitted between the main unit 50 and the console unit 41. At this time, the microcomputer 455 stores the information on the voltages supplied to the gain control port 451a and the frequency characteristic adjustment port 451b, and the measurement result of the delay of the other video signal to the reference signal for each server into the memory (not shown) of the microcomputer 455 (step S19). The present process is terminated.

According to the process of FIG. 12, the gain, the frequency characteristic, and the delay of the RGB signal transmitted between the server unit and the console unit can be collectively adjusted depending on the depression of the switch 431 or the instruction of the automatic adjustment of the RGB signal transmitted between the server unit and the console unit.

As described in detail above, according to the present embodiment of the present invention, the automatic adjustment circuit 521 (522) of the main unit 50 adjusts the gain and the frequency characteristic of the RGB signal output from the server 11, and the automatic adjustment circuit 416 of the console unit 41 adjusts the gain, the frequency characteristic, and the delay of the RGB signal output from the main unit 50.

Therefore, the gain and the frequency characteristic of the RGB signal transmitted between the server and the console are adjusted twice, and the delay of the RGB signal is adjusted once. As a result, it is possible to obtain an optimal video even if the distance between a server and a console is a long distance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A video signal adjustment system that is capable of being connected between servers and consoles, comprising:
    server units, each of which is connected with one of the servers;
    console units, each of which is connected with one of the consoles; and
    a main unit that is connected between the server units and the console units, and selects one of the servers to be accessed by one of the consoles,
    the main unit including:
        a first memory that stores, for each of the servers, first adjustment information for controlling adjustments of gain and frequency characteristic of a video signal output from each of the servers, the first adjustment information being acquired as a result of measuring gain, and frequency characteristics of a reference signal received from each of the servers through a corresponding server unit; and
        a first adjustment portion that, when a server to be accessed by one of the consoles is switched from one to another, adjusts gain and frequency characteristic of a video signal output from a selected server based on the first adjustment information related to the selected server stored in the first memory, and outputs the adjusted video signal to a corresponding console unit; and
    each of the console units including:
        a second memory that stores, for each of the servers, second adjustment information for controlling adjustments of gain, frequency characteristic and delay of a video signal output from each of the servers via the main unit, the second adjustment information being acquired as a result of measuring gain, frequency characteristic, and delay of a reference signal received from each of the servers through main unit; and
        a second adjustment portion that adjusts gain, frequency characteristic, and delay of the adjusted video signal output from the main unit based on the second adjustment information related to the selected server stored in the second memory when the server to be accessed by one of the consoles is switched from one to another.

2. The video signal adjustment system as claimed in claim 1, wherein each of the console units includes a second switch, and the second adjustment portion adjusts the gain, the frequency characteristic, and the delay of the video signal output from the main unit depending on the depression of the second switch or an adjustment instruction of the video signal from the console.

3. The video signal adjustment system as claimed in claim 1, wherein each of the console units includes a second switch, the first adjustment portion adjusts the gain and the frequency characteristic of the video signal output from the selected server depending on the depression of the second switch or an adjustment instruction of the video signal from the console, and the second adjustment portion adjusts the gain, the frequency characteristic, and the delay of the video signal output from the main unit depending on the depression of the second switch or the adjustment instruction of the video signal from the console.

4. The video signal adjustment system as claimed in claim 1, wherein the first adjustment portion includes:

a receiver;

a measurement circuit that inputs a gain adjustment signal and a frequency characteristic adjustment signal output from the selected server, and measures amounts of attenuation of the gain adjustment signal and the frequency characteristic adjustment signal; and a voltage applying portion that includes a first table indicating a relation between the amount of attenuation of the gain adjustment signal and a voltage applied to the receiver, and a second table indicating a relation between the amount of attenuation of the frequency characteristic adjustment signal and a voltage applied to the receiver, and applies voltages to the receiver based on the amounts of attenuation of the gain adjustment signal and the frequency characteristic adjustment signal measured by the measurement circuit, and the first and second tables, and wherein the receiver adjusts the gain and the frequency characteristic of the video signal output from the selected server depending on the voltages applied to the voltage applying portion.

5. The video signal adjustment system as claimed in claim 1, wherein each of the console units is connected between the main unit and each of the consoles, and includes the second adjustment portion that adjusts gain, frequency characteristic, and delay of the video signal output from the main unit based on information of a voltage supplied from the selected server via the first adjustment portion.

6. The video signal adjustment system as claimed in claim 1, wherein the main unit includes a selection portion that selects any one of the first adjustment portion, the second adjustment portion, and a combination of the first adjustment portion and the second adjustment portion, as an actuating object.

7. The video signal adjustment system as claimed in claim 1, wherein the first adjustment portion measures gain, and frequency characteristic of the reference signal output from each of the servers through the corresponding server unit, and determines the first adjustment information for each of the servers upon the measurement, the first memory that stores the first adjustment information determined by the first adjustment portion, the second adjustment portion measures gain, frequency characteristic, and delay of the reference signal output from each of the servers through the main unit, and determines the second adjustment information for each of the servers upon the measurement, and determines the second adjustment information for each of the servers upon the measurement, and the second memory that stores the second adjustment information determined by the second adjustment portion.

8. The video signal adjustment system as claimed in claim 1, wherein the main unit includes a selection portion displayable on a display of a corresponding console unit to allow a selection to be made from any one of the first adjustment portion, the second adjustment portion, and a combination of the first adjustment portion and the second adjustment portion for controlling an adjustment setting of the video signal responsive to the selection using the selection portion.

9. A video signal adjustment system that is capable of being connected between servers and consoles, comprising:

server units, each of which is connected with one of the servers;

console units, each of which is connected with one of the consoles; and a main unit that is connected between the server units and the console units, and selects one of the servers, the main unit including:

a first memory that stores, for each server, a plurality of pieces of information used to adjust gain and frequency characteristic of video signals output from the servers; and a first adjustment portion that, when a server is switched from one to another, adjusts gain and frequency characteristic of a video signal output from a selected server based on information related to the selected server stored in the first memory, and outputs the adjusted video signal to a corresponding console unit; and each of the console units including:

a second memory that stores information, for each server, a plurality of pieces of information used to adjust gain, frequency characteristic and delay of video signals output from the servers via the main unit; and a second adjustment portion that adjusts gain, frequency characteristic, and delay of the adjusted video signal output from the main unit based on the information related to the selected server stored in the second memory when the server is switched from one to another, wherein the main unit includes a selection portion that selects any one of the first adjustment portion, the second adjustment portion, and a combination of the first adjustment portion and the second adjustment portion, wherein the second adjustment portion includes:

a receiver;

a measurement circuit that inputs the video signal, a gain adjustment signal and a frequency characteristic adjustment signal output from the selected server, and measures amounts of attenuation of the gain adjustment signal and the frequency characteristic adjustment signal, and an amount of delay of the video signal;

a delay circuit that adjusts the delay of the video signal depending on the amount of delay of the video signal measured by the measurement circuit; and a voltage applying portion that includes a first table indicating a relation between the amount of attenuation of the gain adjustment signal and a voltage applied to the receiver, and a second table indicating a relation between the amount of attenuation of the frequency characteristic adjustment signal and a voltage applied to the receiver, and applies voltages to the receiver based on the amounts of attenuation of the gain adjustment signal and the frequency characteristic adjustment signal measured by the measurement circuit, and the first and second tables, and wherein the receiver adjusts the gain and the frequency characteristic of the video signal output from the selected server depending on the voltages applied to the voltage applying portion.

10. A method of controlling a video signal adjustment system that is capable of being connected between servers and consoles, and includes server units each of which is connected with one of the servers, console units each of which is connected with one of the consoles, and a main unit that is connected with the server units and console units, the method comprising:

measuring, for each of the servers, gain, and frequency characteristic of a reference signal received from each of the servers through a corresponding server unit, and determining first adjustment information for controlling gain, and frequency of a video signal received from each of the servers based on a result of the measuring associated with the reference signal received through the corresponding server unit;

storing, for each of the servers, the first adjustment information into the main unit;

adjusting, when a server to be controlled by one of the consoles is switched from one to another, gain and frequency characteristic of a video signal output from the selected server, based on the first adjustment information related to the selected server stored in the main unit, and outputting the adjusted video signal to a corresponding console unit;

measuring, for each of the servers, gain, and frequency characteristic and delay of a reference signal received from each of the servers through the main unit, and determining second adjustment information for controlling gain, and frequency characteristic and delay of a video signal received from each of the servers based on a result of the measuring associated with the reference signal received through the main unit;

storing, for each of the servers, the second adjustment information into each of the console units; and adjusting gain, frequency characteristic and delay of the adjusted video signal output from the main unit based on the second adjustment information related to the selected server stored in the corresponding console unit when the server to be accessed by one of the consoles is switched from one to another.

11. The method for controlling a video signal adjustment system as claimed in claim 10, wherein gain, frequency characteristic, and delay of the video signal output from the main unit is adjusted based on information of a voltage supplied from the selected server.

12. The method for controlling a video signal adjustment system as claimed in claim 10, comprising:

displaying a selection portion displayable on a display of a corresponding console unit to allow a selection to be made from any one of (i) the adjusting gain and frequency characteristic of the video signal output from the selected server, (ii) the adjusting gain, frequency characteristic, and delay of the adjusted video signal output from the main unit, and (iii) a combination of the adjustment (i) and (ii) for controlling an adjustment setting of the video signal responsive to the selection using the selection portion.

13. A video signal adjustment system that is capable of being connected between servers and consoles, comprising:

server units, each of which is connected with one of the servers;

console units, each of which is connected with one of the consoles; and a main unit that is connected between the server units and the console units, and selects one of the servers to be accessed by a console, the main unit including:
a first memory that stores, for each server, a plurality of pieces of information used to adjust gain and frequency characteristic of video signals output from the servers; and a first adjustment portion that, when a server is switched from one to another, adjusts gain and frequency characteristic of a video signal output from a selected server based on information related to the selected server stored in the first memory, and outputs the adjusted video signal to a corresponding console unit; and each of the console units including:
a second memory that stores information, for each server, a plurality of pieces of information used to adjust gain, frequency characteristic and delay of video signals output from the servers via the main unit; and a second adjustment portion that adjusts gain, frequency characteristic, and delay of the adjusted video signal output from the main unit based on the information related to the selected server stored in the second memory when the server is switched from one to another, wherein the main unit includes a selection portion that selects any one of the first adjustment portion the second adjustment portion, and a combination of the first adjustment portion and the second adjustment portion, as an actuating object.

14. The video signal adjustment system as claimed in claim 13, wherein the main unit includes a selection portion displayable on a display of a corresponding console unit to allow a selection to be made from any one of the first adjustment portion, the second adjustment portion, and a combination of the first adjustment portion and the second adjustment portion for controlling an adjustment setting of the video signal responsive to the selection using the selection portion.

15. The video signal adjustment system as claimed in claim 13, wherein the main unit includes a selection portion providing a selection of any one of the first adjustment portion, the second adjustment portion, and a combination of the first adjustment portion and the second adjustment portion so as to adjust the video signal output from the main unit in correspondence with the selected server.

* * * * *